March 31, 1970 V. R. ROMERO 3,503,622
SUPERMARKET CART

Filed Nov. 7, 1967 4 Sheets-Sheet 2

INVENTOR
VICTOR R. ROMERO
BY
ATTORNEYS

INVENTOR
VICTOR R. ROMERO

ATTORNEYS

March 31, 1970  V. R. ROMERO  3,503,622
SUPERMARKET CART

Filed Nov. 7, 1967  4 Sheets-Sheet 4

INVENTOR
VICTOR R. ROMERO
BY
ATTORNEYS

United States Patent Office 3,503,622
Patented Mar. 31, 1970

3,503,622
SUPERMARKET CART
Victor R. Romero, Albion, Mich., assignor to Union Steel Products Company, Albion, Mich., a corporation of Michigan
Filed Nov. 7, 1967, Ser. No. 681,133
Int. Cl. B62b 3/02, 3/04
U.S. Cl. 280—33.99   46 Claims

ABSTRACT OF THE DISCLOSURE

A supermarket cart comprises a supporting frame with spaced upright stanchions and forwardly projecting inwardly tapered bars forming upper and lower supports open at one side to adapt them to telescope and nest in the frame of other carts, one within the other. Wheels depend from the frame to adapt it to be rolled from one location to another. A fixed receptacle is rigidly mounted on the upper support at the rear thereof and a forwardly projecting movable receptacle is hingedly mounted on the upper support of the frame forwardly of the fixed receptacle. The fixed receptacle includes side walls, a bottom wall and a rear wall having spaced leg receiving openings for a baby. A panel is movably mounted on the rear receptacle for movement from a position wherein it covers the leg receiving openings to a position forwardly where it forms a seat back for a baby seated in the receptacle on the bottom wall thereof. Truss means are provided between the stanchions, and cantilever means support a package tray in a forwardly extending position on the truss means. Bumper elements are provided at the forward end of the movable receptacle.

---

This invention relates to carts of the type disclosed and claimed in the U.S. Letters Patent to Oscar M. Stanley and Charles C. Averill 3,245,498, issued Apr. 12, 1966, which are utilized to transport articles from one location to another as, for example, to transport grocery items from the shelves to the check-out counter in a supermarket.

In the cart described in the aforementioned patent, a frame has spaced upright stanchions and forwardly projecting inwardly tapered bars forming upper and lower supports open at one side to adapt them to telescope and nest in the frame of other carts, one within the other. Wheels depend from the frame to adapt it to be rolled from one location to another. A fixed receptacle is rigidly mounted on the upper support at the rear thereof and a forwardly projecting movable receptacle is hingedly mounted on the upper support of the frame forwardly of the fixed receptacle for rocking movement to an upright position enclosing the latter. A gate is provide at the forward end of the movable receptacle for closing the forward end of the receptacle.

Among the objects of the present invention are to provide a cart of the aforementioned type which incorporates a novel type of baby seat, a novel package tray and novel bumper elements.

Figure 1:
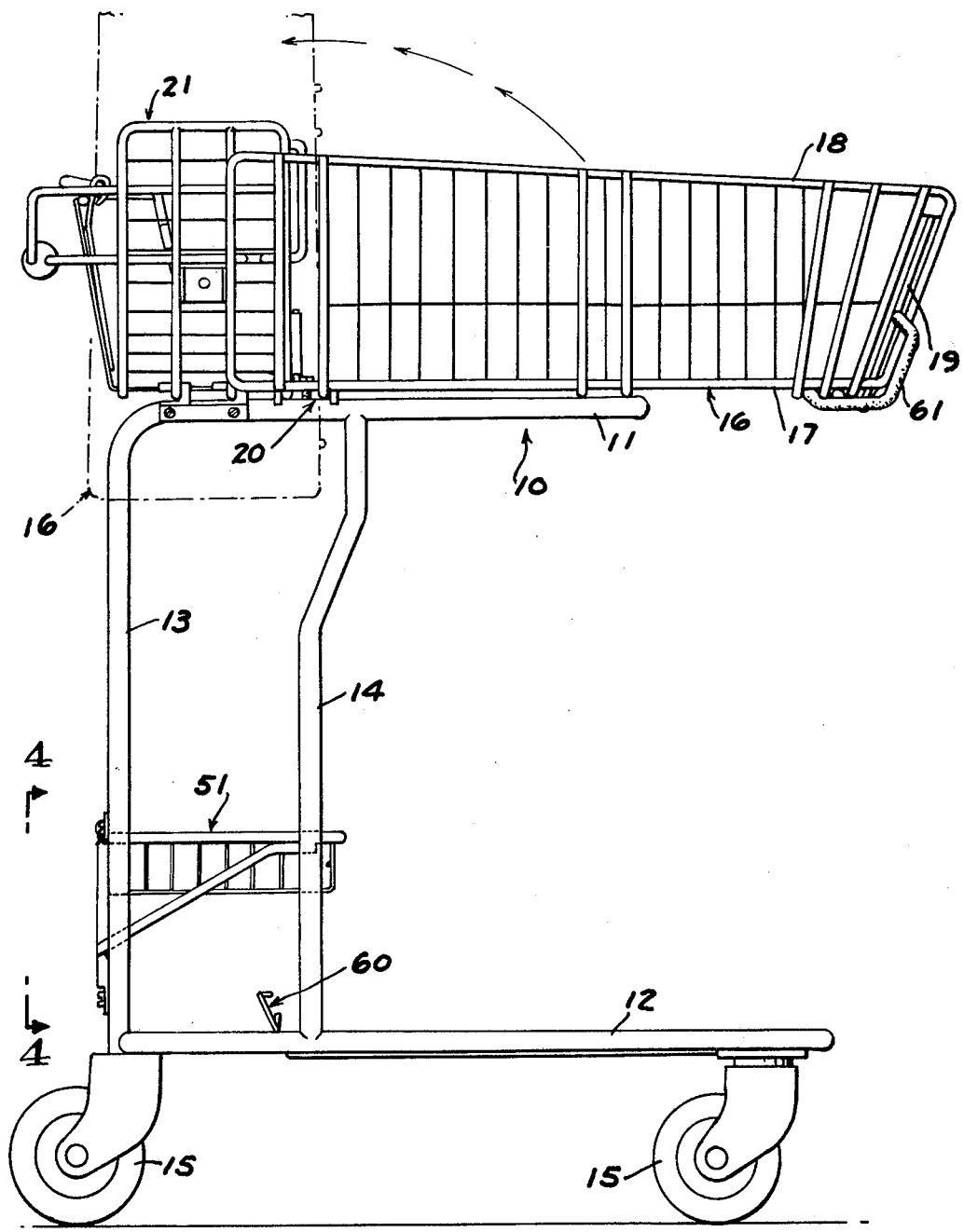
FIG. 1 is a side elevational view of a cart embodying the invention.

Referring to FIG. 1, the cart embodying the invention comprises a frame 10, preferably constructed of metal tubing, bent to form upper and lower horizontal supports 11, 12 which are shown as having inwardly and forwardly tapered side bars connected by upright stanchion members 13. Struts 14 extend between the support members 11, 12 to reinforce them. Wheels 15 mounted by swivel casters depend from the lower support 12 to adapt the cart to be rolled from one location to another.

As further set forth in the aforementioned Patent 3,245,498, a forwardly projecting movable receptacle 16 having a bottom wall 17, side walls 18 and a downwardly and forwardly open end gate 19 is hingedly mounted at 20 for swinging movement from a position shown wherein the bottom wall 17 engages the upper support 11 to the broken line position rearwardly wherein the receptacle 16 is upright and encloses a fixed receptacle 21 mounted at the rear of the upright support 11.

Figure 2:
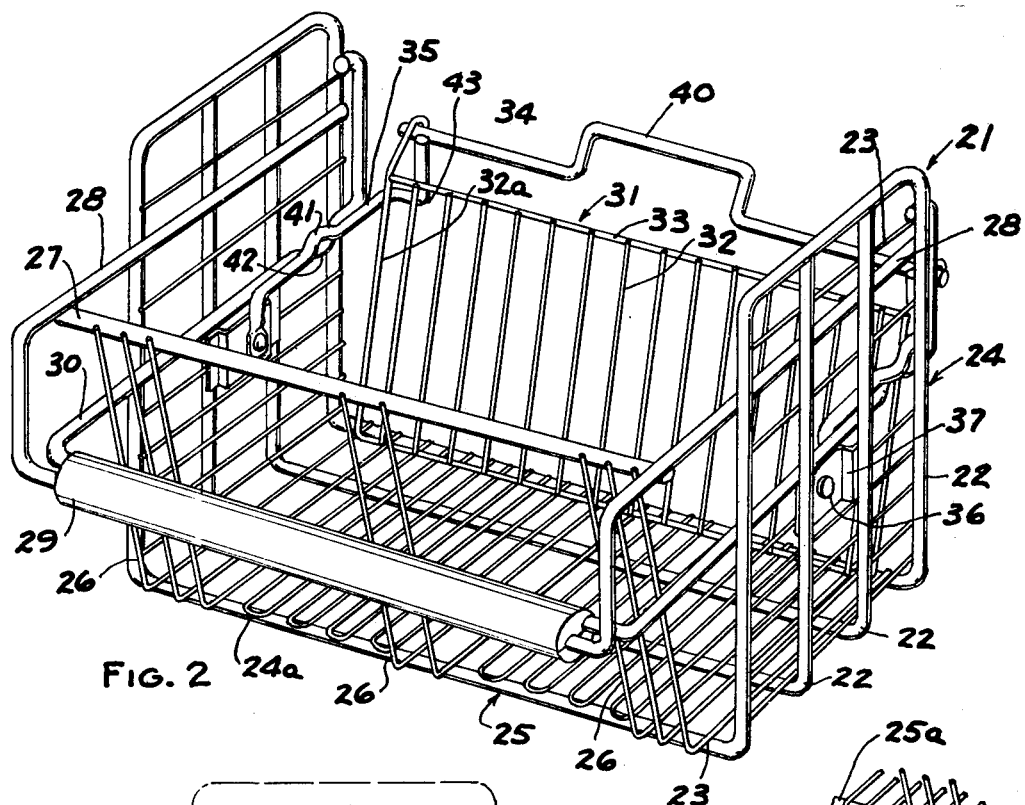
FIG. 2 is a perspective view of the fixed rear receptacle portion of the cart shown in FIG. 1.
Figure 2A:
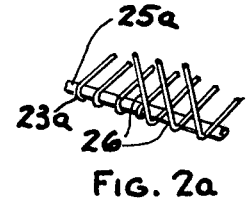
FIG. 2a is a fragmentary perspective view of a modified form of the fixed rear receptacle portion of the cart.

Referring to FIG. 2, in accordance with the invention, the fixed rear receptacle 21 comprises U-shaped wire rods 22 having wires 23 extending transversely thereof and welded thereto to define side walls 24 and a bottom wall 25. Portions 26 of some of the bottom wires 23 are bent upwardly and into engagement with a cross rod 27 to form the rear wall of the fixed receptacle 21. Rod 27 extends between side rods 28 fixed adjacent the upper ends of the side walls 24 and extending rearwardly into the ends of a handle 29. The handle 29 is further supported by additional side rods 30 which are also fixed to the side walls 24 and have their ends extending into the handle 29 which may be made of plastic, wood or metal. Some of the bottom wires 23 terminate at the rear wall to form leg receiving openings L. These adjacent wires are connected by loops 24a at the leg receiving openings L. Alternatively as shown in FIG. 2a, the ends 23a may be bent around the frame bar 25a.

Figure 3:
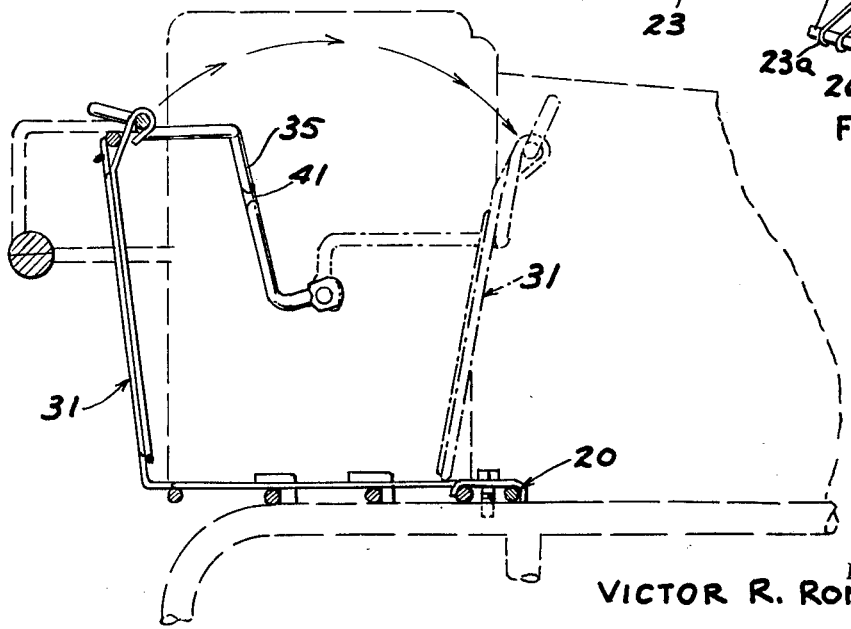
FIG. 3 is a fragmentary sectional view of the portion of the cart shown in FIG. 2.

A panel 31 is formed of vertical wires 32 connected by horizontal wires 33 and is suspended at its upper end for swinging movement from the solid line position shown in FIG. 3 wherein the panel 31 closes the leg receiving openings L in the rear wall to the broken line position shown in FIG. 3 where the panel 31 forms a back for a baby seated on the bottom wall 25 with its legs extending through the leg receiving openings L. The upper ends of endmost wires 32a of panel 31 extend upwardly and are looped over a cross rod 34 that is fixed to the outer ends of pivot arms 35 to suspend the panel from cross rod 34. The inner ends of pivot arms 35 are pivoted by rivets 36 to brackets 37 on the side walls 24. In this manner, the panel is mounted for swinging movement between its two positions. As shown in FIG. 3, the pivot arms 35 are generally Z-shaped. The cross rod 34 includes an upwardly bent portion 40 forming a handle to facilitate movement of the panel without injury to the fingers.

Intermediate portions 41 of the pivot arms 35 are adapted to engage outwardly bent portions 42 on the rods 30 to limit the downward swinging movement of the pivot arms to the position wherein the panel 31 forms a seat back. As further shown in FIG. 2, portions 43 of the pivot arms are bent inwardly for engagement with the panel 31 to limit the forward movement of the panel 31 when the panel forms a seat back.

By grasping the handle 40, the panel may be swung between the position forming the baby seat and the position where the interior of the receptacle 31 communicates with the open rear end of the movable receptacle 18 to define a larger article receiving area.

Figure 4:
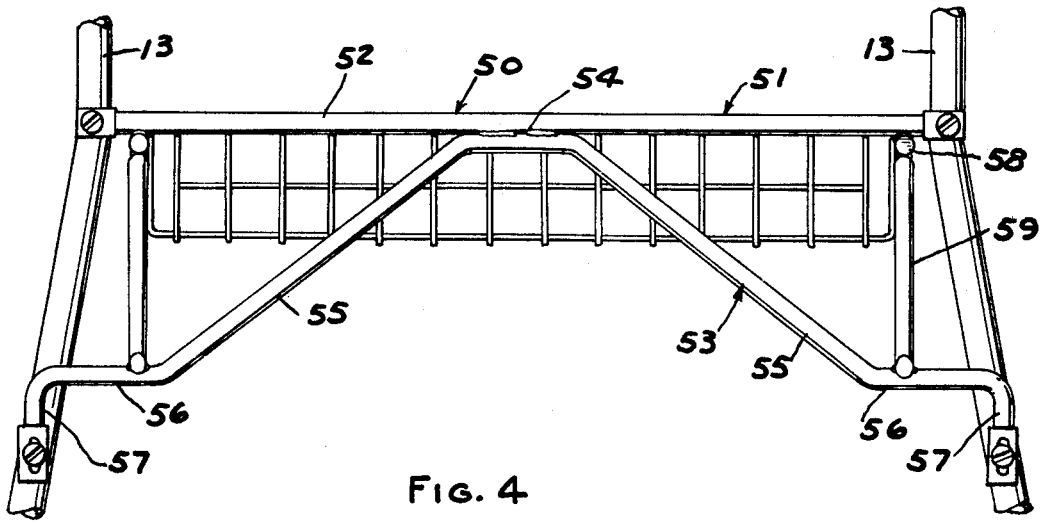
FIG. 4 is a fragmentary rear elevational view taken along the line 4—4 in FIG. 1.
Figure 5:
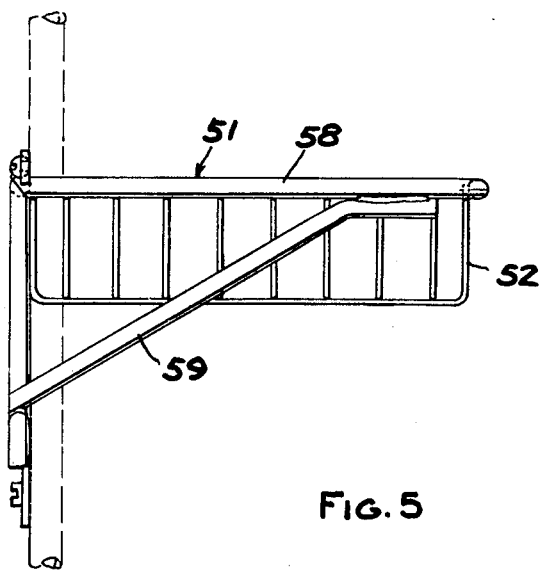
FIG. 5 is a fragmentary side elevational view of the portion of the cart shown in FIG. 4.

Referring to FIGS. 1, 4 and 5, a truss structure 50 extends between the stanchions 13 of the cart and cantilever support means 51 on the truss 50 support a large package tray 52 for receiving large articles. The truss structure 50 comprises a horizontal bar 52 that extends between the stanchions 13 and is connected thereto by screws or rivets. A cross bar 53 which is welded as at 54 intermediate its ends to the bar 52 and has portions 55 extending downwardly and outwardly, additional horizontal portions 56 and generally vertical end portions 57, the latter being connected to the stanchions 13.

The cantilever tray support means 51 comprises a U-shaped wire rod 58 that has its ends welded to the cross bar 52 and braces 59 which have one end welded to the horizontal portions 56 of bar 53 and the other end extending along and welded to the sides of the rod 58.

As shown in FIG. 1, a wire shelf 60 is provided across the side bars of the lower support for receiving additional articles.

Figure 6:
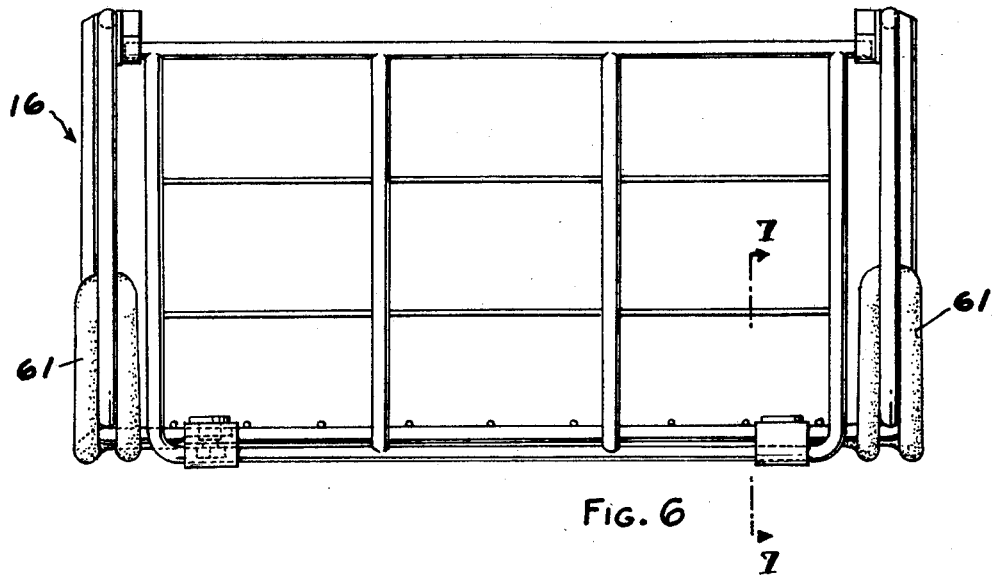
FIG. 6 is a front elevational view of a portion of the cart.
Figures 7, 8:
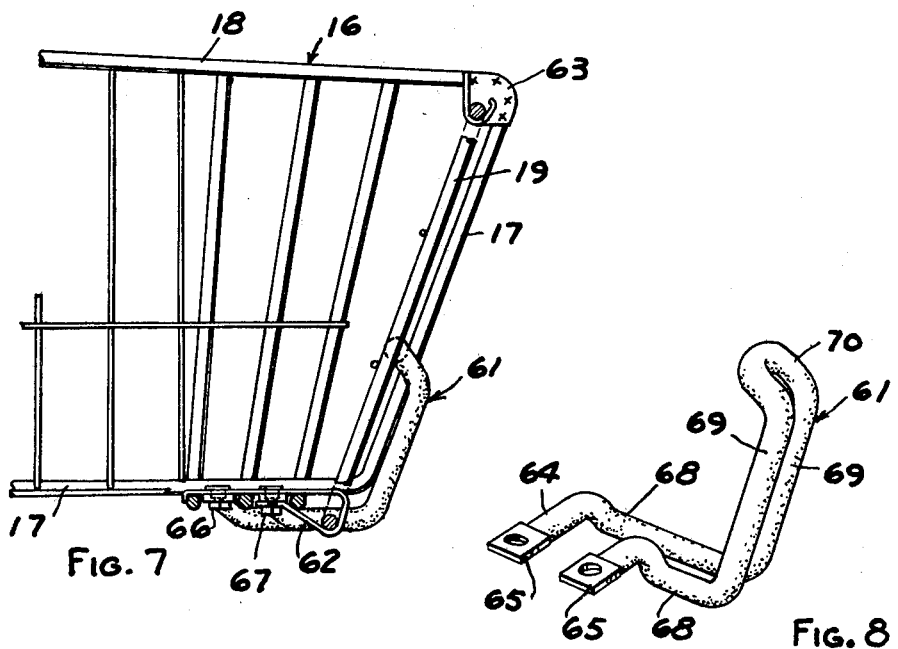
FIG. 7 is a fragmentary sectional view taken along the line 7—7 in FIG. 6.
FIG. 8 is a perspective view of the bumper element shown in FIGS. 6 and 7.

As more clearly shown in FIGS. 6 and 7, bumper elements 61 are provided at the front outer end of the movable receptacle 16. The end gate 19 is hinged at its lower end to the bottom wall 17 by brackets 62 and is held in position by engagement with brackets 63 at its upper end. Bumper elements 61 at the sides of the forward end of th ereceptacle are mirror images of one another and comprise a one-piece wire rod bent as shown in FIG. 8 so that the free ends 64 extend inwardly and are flattened as at 65 to receive the bolts 66, 67 that normally hold the bracket 62 on the bottom wall 17. Each bumper element 61 further includes forwardly extending horizontal portions 68 that extend beneath the bottom wall 17 and upwardly and forwardly extending portions 69 that define the bumper. The upper ends of the bumper portions 69 are connected by an upwardly and rearwardly extending loop 70.

Each bumper element 61 is mounted on the forward end of the receptacle 16 by threading the elements over the forward bar 71 at the forward end of each side wall 18 and thereafter fixing the bumper element 61 by passing the bolts 66, 67 through the flattened portions 64, 65 of the bumper element 61. In this position, the bumper portions 69 are provided alongside each forward rod 71 and forwardly thereof to serve as protection for the front end of the movable receptacle 16. Each bumper element 61 is preferably covered with a thick coating of plastic material such as an organic plastisol.

Although the structure has been described as using tubing, wires and rods, other materials may be used such as wood, molded plastics, metal stampings and die castings.

What is claimed is:

1. In a cart for transporting articles of the type having a wheeled frame of a shape to telescope in a correspondingly shaped frame of another cart, an upright fixed receptacle mounted on the frame, and a receptacle having a bottom and pivotally mounted on the frame for rocking movement from a forwardly extending to an upright position by the engagement of its forward end with another cart, the improvement wherein said fixed receptacle comprises spaced side walls, a bottom wall and a rear wall rigidly connected to said frame, said rear wall having spaced leg receiving openings for a baby, a panel, means for supporting and suspending said panel adjacent its upper end from said side walls for arcuate swinging movement between a position wherein said panel covers the leg receiving openings in said rear wall and a position forwardly wherein said panel defines a back for a baby seated on the bottom wall with its legs projecting through the leg receiving openings.

2. The combination set forth in claim 1 including means for holding said panel in said second-named position against forward movement.

3. The combination set forth in claim 1 wherein said means for suspending said panel for movement comprises pivot arms pivoted to said side walls and to the upper end of said panel.

4. The combination set forth in claim 3 including interengaging means between said pivot arms and said side walls for limiting the pivotal movement of said arms toward said second-named position wherein said panel forms the seat back.

5. The combination set forth in claim 3 including means for limiting the pivotal movement of said pivot arms to said first-mentioned position wherein said panel is positioned adjacent said rear wall and covering the leg openings.

6. The combination set forth in claim 3 including interengaging means between said pivot arms and said panel forming a stop for limiting the forward movement of said panel in said second-named position.

7. The combination set forth in claim 1 wherein said means for mounting said panel for movement comprises a pair of arms having one end pivoted to said side walls,
a cross bar extending between the other end of said arms,
and means for suspending said panel from said cross bar.

8. The combination set forth in claim 7 wherein said pivot arms have portions thereof adapted to engage portions of said side walls to limit the pivotal movement of said arms downwardly toward said second position wherein said panel forms the seat back.

9. The combination set forth in claim 7 wherein portions of said arms extend inwardly for engagement with portions of said panel to limit the forward movement of said panel in said second-named position wherein said panel defines the seat back.

10. The combination set forth in claim 7 wherein a portion of said cross rod forms a handle for swinging said panel between its two positions.

11. The combination set forth in claim 1 wherein said frame includes upright stanchions beneath said fixed receptacle,
truss means extending between said stanchions,
a package tray,
cantilever means mounting said tray on said truss means.

12. The combination set forth in claim 1 wherein said means for mounting said panel for movement comprises a pair of wire arms having one end pivoted to said side walls,
a wire cross bar extending between the other end of said arms,
said panel being pivoted to said cross bar and suspended therefrom.

13. The combination set forth in claim 12 wherein portions of said pivot arms are deformed for engagement with portions of said side walls to limit the pivotal movement of said arms downwardly toward said second position wherein said panel forms the seat back.

14. The combination set forth in claim 12 wherein portions of said arms are bent inwardly for engagement with portions of said panel to limit the forward movement of said panel in said second-named position wherein said panel defines the seat back.

15. The combination set forth in claim 12 wherein a portion of said cross bar forms a handle for swinging said panel between its two positions.

16. The combination set forth in claim 1 including bumper elements at the forward end of said movable receptacle.

17. The combination set forth in claim 16 wherein said bumper elements are coated with plastic material.

18. A cart for transporting articles comprising
a supporting frame including spaced upright stanchions and forwardly projecting inwardly tapered bars forming upper and lower supports open at one side to adapt them to telescope and nest in the frame of other carts, one within the other,
wheels depending from said frame to adapt to be rolled from one location to another,
an upright fixed receptacle mounted on the rear of the upper support of the frame,
and a receptacle having a bottom and pivotally mounted on the upper support of the frame for rocking movement from a forwardly extending to an upright position by the engagement of its forward end with another cart,
said fixed receptacle comprising spaced side walls, a bottom wall and a rear wall rigidly connected to said frame,
said rear wall having spaced leg receiving openings for a baby,
a panel,
means for supporting and suspending said panel adjacent its upper end from said side walls for arcuate swinging movement between a position wherein said panel covers the leg receiving openings in said rear wall and a position forwardly wherein said panel defines a back for a baby seated on the bottom wall with its legs projecting through the leg receiving openings.

19. The combination set forth in claim 18 wherein means for suspending said panel for movement comprises a pair of arms having one end pivoted to said side walls, a cross bar extending between the other end of said arms,
and means for suspending said panel from said cross bar.

20. The combination set forth in claim 19 wherein portions of said pivot arms are formed for engagement with portions of said side walls to limit the pivotal movement of said arms downwardly toward said second position wherein said panel forms the seat back.

21. The combination set forth in claim 19 wherein portions of said arms are formed for engagement with portions of said panel to limit the forward movement of said panel in said second-named position wherein said panel defines the seat back.

22. The combination set forth in claim 19 wherein a portion of said cross bar forms a handle for swinging said panel between its two positions.

23. The combination set forth in claim 18 wherein said frame includes upright stanchions beneath said fixed receptacle,
truss means extending between said stanchions,
a package tray,
cantilever means mounting said tray on said truss means.

24. The combination set forth in claim 18 including bumper elements at the forward end of said movable receptacle.

25. The combination set forth in claim 24 wherein said bumper elements are coated with plastic material.

26. In a cart for transporting articles of the type having a wheeled frame of a shape to telescope in a correspondingly shaped frame of another cart, an upright fixed receptacle mounted on the frame, and a receptacle having a bottom and pivotally mounted on the frame for rocking movement from a forwardly extending to an upright position by the engagement of its forward end with another cart, the improvement wherein
said fixed receptacle comprises spaced side walls, a bottom wall and a rear wall rigidly connected to said frame,
said rear wall having spaced leg receiving openings for a baby,
a panel,
means for mounting said panel for movement from a position wherein said panel covers the leg receiving openings in said rear wall to a position forwardly wherein said panel defines a back for a baby seated on the bottom wall with its legs projecting through the leg receiving openings,
said frame including upright stanchions beneath said fixed receptacle,
truss means extending between said stanchions,
a package tray,
cantilever means mounting said tray on said truss means,
said truss means comprising a horizontal member extending between the laterally spaced stanchions,
and a second member having a mid portion thereof fixed to said horizontal member and having spaced legs extending downwardly and outwardly with their ends fixed to said stanchions.

27. The combination set forth in claim 26 wherein said tray supporting cantilever means comprises a U-shaped member having its ends fixed to said horizontal member and extending horizontally and forwardly and braces extending between said U-shaped member and said second truss member.

28. In a cart for transporting articles of the type having a wheeled frame of a shape to telescope in a correspondingly shaped frame of another cart, an upright fixed receptacle mounted on the frame, and a receptacle having a bottom and pivotally mounted on the frame of rocking movement from a forwardly extending to an upright position by the engagement of its forward end with another cart, the improvement wherein
said fixed receptacle comprises spaced side walls, a bottom wall and a rear wall rigidly connected to said frame,
said rear wall having spaced leg receiving openings for a baby,
a panel,
means for mounting said panel for movement from a position wherein said panel covers the leg receiving openings in said rear wall to a position forwardly wherein said panel defines a back for a baby seated on the bottom wall with its legs projecting through the leg receiving openings,
bumper elements at the forward end of said movable receptacle,
said movable receptacle including upwardly extending members at the forward outer ends thereof,
said bumper elements comprising spaced bumper portions on each side of said upright member,
and means for mounting each said bumper element with said spaced bumper portions on each side of said upright member and forwardly thereof.

29. The combination set forth in claim 28 wherein each said bumper element comprises a one-piece member,
said bumper portions being connected at their upper ends by a loop portion,
the lower ends of said bumper portions having inwardly extending portions.

30. The combination set forth in claim 29 including a bracket for supporting said inwardly extending portions on the bottom wall of said movable receptacle.

31. The combination set forth in claim 29 wherein said movable receptacle includes a front end gate,
means for hinging said gate at its lower end to the bottom wall of said movable receptacle,
said last-mentioned means also supporting said bumper elements.

32. The combination set forth in claim 29 wherein each said bumper element is covered with a coating of plastic material.

33. A cart for transporting articles comprising
a supporting frame including spaced upright stanchions and forwardly projecting inwardly tapered bars forming upper and lower supports open at one side to adapt them to telescope and nest in the frame of other carts, one within the other,
wheels depending from said frame to adapt to be rolled from one location to another,
an upright fixed receptacle mounted on the rear of the upper support of the frame,
and a receptacle having a bottom and pivotally mounted on the upper support of the frame for rocking movement from a forwardly extending to an upright position by the engagement of its forward end with another cart,
said fixed receptacle comprising spaced side walls, a bottom wall and a rear wall rigidly connected to said frame,
said rear wall having spaced leg receiving openings for a baby,
a panel,
means for mounting said panel on the side walls of said fixed receptacle for movement from a position wherein said panel covers the leg receiving openings in said rear wall to a position forwardly wherein said panel defines a back for a baby seated on the bottom wall with its legs projecting through the leg receiving openings,
said frame including upright stanchions beneath said fixed receptacle,
truss means extending between said stanchions,
a package tray,
cantilever means mounting said tray on said truss means,
said truss means comprising a horizontal member extending between the laterally spaced stanchions,
and a second member having a mid portion thereof fixed to said horizontal member and having spaced legs extending downwardly and outwardly with their ends fixed to said stanchions.

34. The combination set forth in claim 33 wherein said tray supporting cantilever means comprises a U-shaped member having its ends fixed to said horizontal member and extending horizontally and forwardly and braces extending between said U-shaped member and said second truss member.

35. A cart for transporting articles comprising
a supporting frame including spaced upright stanchions and forwardly projecting inwardly tapered bars forming upper and lower supports open at one side to adapt them to telescope and nest in the frame of other carts, one within the other,
wheels depending from said frame to adapt to be rolled from one location to another,
an upright fixed receptacle mounted on the rear of the upper support of the frame,
and a receptacle having a bottom and pivotally mounted on the upper support of the frame for rocking movement from a forwardly extending to an upright position by the engagement of its forward end with another cart,
said fixed receptacle comprising spaced side walls, a bottom wall and a rear wall rigidly connected to said frame,
said rear wall having spaced leg receiving openings for a baby,
a panel,
means for mounting said panel on the side walls of said fixed receptacle for movement from a position wherein said panel covers the leg receiving openings in said rear wall to a position forwardly wherein said panel defines a back for a baby seated on the bottom wall with its legs projecting through the leg receiving openings,
bumper elements at the forward end of said movable receptacle,
said movable receptacle including upwardly extending members at the forward outer ends thereof,
said bumper elements comprising spaced bumper portions on each side of said upright member,
and means for mounting each said bumper element with said spaced bumper portions on each side of said upright member and forwardly thereof.

36. The combination set forth in claim 35 wherein said bumper element comprises a one-piece member,
said bumper portions being connected at their upper ends by a loop portion,
the lower ends of said bumper portions having inwardly extending portions.

37. The combination set forth in claim 36 including a bracket for supporting said inwardly extending portions on the bottom wall of said movable receptacle.

38. The combination set forth in claim 36 wherein said movable receptacle includes a front end gate,
means for hinging said gate at its lower end to the bottom wall of said movable receptacle,
said last-mentioned means also supporting said bumper elements.

39. The combination set forth in claim 36 wherein each said bumper element is covered with a coating of plastic material.

40. In a cart for transporting articles of the type having a wheeled frame of a shape to telescope in a correspondingly shaped frame of another cart, an upright fixed receptacle mounted on the frame, and a receptacle having a bottom and pivotally mounted on the frame for rocking movement from a forwardly extending to an upright position by the engagement of its forward end with another cart, the improvement wherein
said frame includes upright stanchions beneath said fixed receptacle,
truss means extending between said stanchions,
a package tray,
cantilever means mounting said tray on said truss means,
said truss means comprising a horizontal member extending between the laterally spaced stanchions,
and a second member having a mid-portion thereof fixed to said horizontal member and having spaced legs extending downwardly and outwardly with their ends fixed to said stanchions.

41. The combination set forth in claim 40 wherein said tray supporting cantilever means comprises a U-shaped member having its ends fixed to said horizontal member and extending horizontally and forwardly and braces extending between said U-shaped member and said second truss member.

42. In a cart for transporting articles of the type having a wheeled frame of a shape to telescope in a correspondingly shaped frame of another cart, an upright fixed receptacle mounted on the frame, and a receptacle having a bottom and pivotally mounted on the frame for rocking movement from a forwardly extending to an upright position by the engagement of its forward end with another cart, the improvement comprising
bumper elements at the forward end of said movable receptacle,
said movable receptacle including upwardly extending members at the forward outer end thereof,
said bumper elements comprising spaced bumper portions on each side of said upright member,
said upright member and forwardly thereof.
and means for mounting each said bumper element with said spaced bumper portions on each side of 43. The combination set forth in claim 42 wherein said bumper element comprises a one-piece member,
  said bumper portions being connected at their upper ends by a loop portion,
  the lower ends of said bumper portions having inwardly extending portions.

44. The combination set forth in claim 43 including a bracket for supporting said inwardly extending portions on the bottom wall of said movable receptacle.

45. The combination set forth in claim 44 wherein said movable receptacle includes a front end gate,
  means for hinging said gate at its lower end to the bottom wall of said movable receptacle,
  said last-mentioned means also supporting said bumper elements.

46. The combination set forth in claim 45 wherein each said bumper element is covered with a coating of plastic material.

References Cited

UNITED STATES PATENTS

| | | | |
|---|---|---|---|
| 2,479,530 | 8/1949 | Watson | 280—33.99 |
| 2,689,133 | 9/1954 | Goldman | 280—33.99 |
| 2,943,707 | 7/1960 | Ramlose | 280—33.99 |
| 3,039,783 | 6/1962 | Stanley | 280—33.99 |
| 3,195,912 | 7/1965 | Howard et al. | 280—33.99 |
| 3,245,498 | 4/1966 | Stanley et al. | 280—33.99 |
| 3,361,438 | 1/1968 | Davis | 280—33.99 |

OTHER REFERENCES

United Shopping Carriers Catalog, United Steel and Wire Co., Battle Creek, Mich., November 1957, description of United 196, 198, 195 and 187 on pp. 2 and 3.

LEO FRIAGLIA, Primary Examiner

MILTON L. SMITH, Assistant Examiner

PO-1050
(5/69)

UNITED STATES PATENT OFFICE
CERTIFICATE OF CORRECTION

Patent No. 3,503,622  Dated March 31, 1970

Inventor(s) Victor R. Romero

It is certified that error appears in the above-identified patent and that said Letters Patent are hereby corrected as shown below:

Column 4, line 30, after "for" insert --pivotally--.
Column 4, line 43, cancel "rod" and insert --bar--.

Column 8, line 75, after "side of" insert --said upright member and forwardly thereof.--

SIGNED AND
SEALED
AUG 25 1970

(SEAL)
Attest:

Edward M. Fletcher, Jr.
Attesting Officer

WILLIAM E. SCHUYLER, JR.
Commissioner of Patents